United States Patent [19]

Kawabe et al.

[11] Patent Number: 4,739,160
[45] Date of Patent: Apr. 19, 1988

[54] OPTICAL COORDINATE DATA ENTRY DEVICE WITH INTEGRAL LENS AND SPACER

[75] Inventors: Shuichi Kawabe, Kogota; Hiroaki Sasaki, Furukawa, both of Japan

[73] Assignee: Alps Electric Co., Ltd., Japan

[21] Appl. No.: 864,705

[22] Filed: May 19, 1986

[30] Foreign Application Priority Data

May 17, 1985 [JP] Japan ............................. 60-105325
May 17, 1985 [JP] Japan ............................. 60-73137[U]

[51] Int. Cl.$^4$ ............................................. G01V 9/04
[52] U.S. Cl. .................................. 250/221; 250/222.1
[58] Field of Search ................... 250/221, 222.1, 216, 250/208, 209; 340/555, 556, 557

[56] References Cited

U.S. PATENT DOCUMENTS

| | | | |
|---|---|---|---|
| 3,551,683 | 9/1968 | Tothill | 250/221 |
| 3,694,658 | 9/1972 | Watson et al. | 250/560 |
| 3,727,069 | 4/1973 | Crittenden et al. | 250/222.1 |
| 3,819,938 | 6/1974 | Kornrumpf et al. | 250/222.1 |

Primary Examiner—David C. Nelms
Attorney, Agent, or Firm—Guy W. Shoup

[57] ABSTRACT

An optical coordinate data entry device mounted on the face of a display device. The entry device comprises an array of light-emitting devices, an array of light-receiving devices corresponding to the light-emitting devices, and a condenser lens member extending parallel to the arrays for directing the light beams coming from the light-emitting devices onto the light-receiving devices. A spacer acting also as a light-blocking member is formed integrally with the lens member.

5 Claims, 3 Drawing Sheets

OPTICAL COORDINATE DATA ENTRY DEVICE WITH INTEGRAL LENS AND SPACER

FIELD OF THE INVENTION

The present invention relates to an optical detection type coordinate data entry device which is mounted on the face of a display device and which acts to detect coordinates relative to the display device and also to enter the derived data into a computer. More particularly, the invention relates to an optical coordinate data entry device which comprises an improved array arrangement for producing matrix-like infrared beams and which is mounted like a frame around the face of the display device.

BACKGROUND OF THE INVENTION

Devices which allow the user to manually enter coordinate data into a host computer make use of various systems including electromagnetic induction system, electrostatic capacitance system, transparent electrode system, and optical detection system. Among these devices, the device of the optical detection type has attracted interest from viewpoint of reliability and ease with which the device is operated. Specifically, this optical detection type device is mounted on the face of a display device. The user can specify coordinates in a noncontacting manner simply by depressing a desired location on the display device with a finger or other means.

A conventional coordinate data entry device of the optical detection type is shown in FIGS. 8-11. The entry device, shown to be installed on the face of a display device 3 in FIG. 8, is shaped into a substantially rectangular form. This entry device is primarily composed of a frame 1 having an opening 2 at its center, arrays of light-emitting devices 4 such as light-emitting diodes, arrays of light-receiving devices 5 such as phototransistors, and an arithmetic section 6. The display device 3 consists, for example, of a cathode-ray tube and has a viewing screen 3a. The arrays 4 and 5 are disposed around the screen 3a, i.e., on the back side of the frame 1, in such a way that one array of light-emitting devices 4 is opposite to one array of light-receiving devices 5 and that the other array of light-emitting devices 4 is opposite to the other array of light-receiving devices 5. Each light-emitting device 4 emits light toward the corresponding light-receiving device 5 along a light path 12. When any one of such light paths 12 is blocked, the arithmetic section 6 detects it and enters the coordinate data into a host computer (not shown).

An operation panel 2a comprising a video display terminal filter is mounted in the opening 2. This panel is installed on the viewing screen 3a of the display device 3 to prevent the screen from becoming fouled or dust from adhering to it. Further, it prevents fatigue of the user's eye. Each light-emitting device 4 has a light-emitting section 4a. Each light-receiving device 5 has a light-receiving section 5a. The light-emitting devices 4 and the light-receiving devices 5 are rigidly secured to a baseplate 7 mounted on the frame 1, in such a manner that the light-receiving sections 5a face their respective light-emitting sections 4a. The arrays 4 and 5 are arranged along the sides of the baseplate 7 to detect only a certain operation region A, corresponding to the display region that is presented on the viewing screen 3a for data entry. The arrays 4 and 5 do not extend to marginal regions B to prevent their optical axes from intersecting each other. A light-blocking plate 8 is disposed in front of the light-receiving section 5a of each light-receiving device 5, and is provided with a hole 8a to permit the light coming from the corresponding light-emitting device 4 to pass through it. The hole 8a has a certain area and a certain depth. In order to cut off visible light, an infrared filter 9 is mounted in front of the light-blocking plate 8. A similar infrared filter 9 is mounted over the whole periphery of the front opening of the light-emitting device 4. Accordingly, invisible light paths 12 are formed by the use of the infrared filter 9 on the side of the operation panel 2a that does not face the viewing screen 3a.

When coordinates are detected, the position on the screen 3a whose coordinates are to be entered is depressed with a finger 10 or other means from above the operation panel 2a, as shown in FIGS. 8-10. The light paths 12 are formed along the surface of the panel 2a. The light-emitting devices 4 are successively caused to emit for making scan along the x- and y-axes. The emitted light beams are successively detected by the light-receiving devices 5. Thus, any blocked light path 12 can be detected, and is specified by the arithmetic section 6 which then sends the coordinate data to the host computer (not shown).

Another general structure for mounting the light-emitting devices 4 and the light-receiving devices 5 and for use in the conventional optical coordinate data entry device is shown in FIG. 11, where a printed-wiring board 7 forms a base. An optical semiconductor device 32 that is a light-emitting or -receiving device is fabricated separately. This device 32 is mounted on the board 7 and soldered at 33. Then, light-blocking plates 34 and a stop member 35 for gathering light are mounted. Each array is manufactured in this way, and the arrays are electrically interconnected.

The conventional array for an optical coordinate data entry device is constructed as described just above. Hence, the array is made up of a large number of components and require many steps to manufacture, increasing the product price greatly. Further, the accuracy may differ among optical devices.

SUMMARY OF THE INVENTION

Accordingly, it is an object of the present invention to provide an optical coordinate data entry device which is free of the foregoing difficulties with the prior art techniques, is made up of a less number of components, requires a less number of steps to manufacture, does not vary in accuracy from product to product, and can be manufactured more economically than conventional.

The above object is achieved by an entry device having arrays of light-emitting devices and corresponding arrays of light-receiving devices, the entry device being characterized by the provision of a light beam-gathering member for gathering and directing the light beams coming from the light emitting devices onto the light-receiving devices.

In another feature of the invention, the light beam-gathering member consists of an array of optical elements or chips of an optical element material arrayed on a baseplate. A lens member for collecting light is spaced a given distance from the optical elements or chips. A spacer acting also as a light-blocking plate is formed integrally with the lens member.

In a further feature of the invention, each of the arrays consists of a light-emitting or -receiving material arrayed on a baseplate. A light-blocking member is close to each chip, and is formed integrally with the baseplate. A lens member which extends continuously is spaced a given distance from the chips.

The light beams emitted from the light-emitting devices are focused on the respective light-receiving devices by the light beam-gathering member and received by the light beam-receiving devices. Since the spacer acting also as a light-blocking plate is integral with the lens member for gathering light, the number of components is made less than conventional.

Also, the arrays are small in size and can stably convert light into electrical signal, because they are fabricated as mentioned above.

Other objects and features of the invention will appear in the course of description thereof that follows.

DETAILED DESCRIPTION OF THE INVENTION

Figure 1:
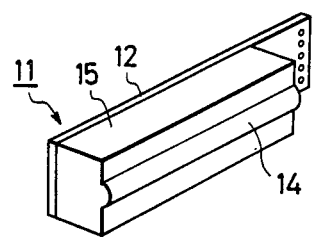
FIG. 1 is a perspective view of an array according to the invention.
Figure 2:
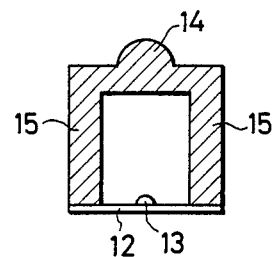
FIG. 2 is a cross-sectional view of the array shown in FIG. 1.

Referring to FIGS. 1 and 2, there is shown an array according to the invention. This array, generally indicated by numeral 11, has a printed-wiring board 12 that forms a base. Chips 13 of a light-emitting or -receiving material are bonded to the board 12 and aligned longitudinally. The chips 13 are regularly spaced from one another. A lens member 14 is spaced a given distance from the chips 13. This lens member 14 is so shaped as to be semicircular in cross section and extend along the array of the chips 13. A spacer 15 which takes a U-shaped form in cross section is formed integrally with the lens member 14. The spacer 15 acts also as a light-blocking plate. The end surfaces 15 bear on, and are fixed to, the lateral fringes of the board 12. If necessary, the outer surface of the spacer 15 may be painted or smoked to enhance the efficiency of light shield. It is also possible to seal each chip 13 separately by making the spacer 15 extend between the successive chips 13 as well as longitudinally. The use of the chips 13 of a material can dispense with the steps for manufacturing light-emitting diodes or phototransistors. The lens member 14 allows the chips 13 to be used as optical elements.

Figure 3:
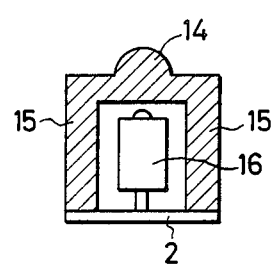
FIG. 3 is a cross-sectional view of another array according to the invention.

Referring next to FIG. 3, there is shown another array according to the invention. This array is similar to the array shown in FIGS. 1 and 2, except that optical elements 16 are arrayed on the printed-wiring board 12 in a conventional fashion.

Figure 4:
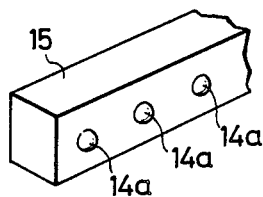
FIG. 4 is a fragmentary perspective view of a lens member according to the invention.

A modification of the lens member 14 is shown in FIG. 4, where semispherical lens sections 14a are regularly spaced from one another.

Figure 5:
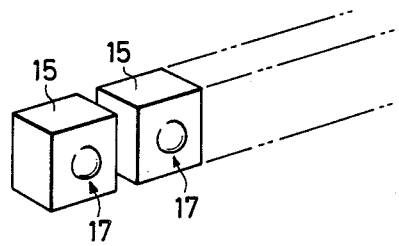
FIG. 5 is a perspective view of another lens member according to the invention.

A further modification of the lens member is shown in FIG. 5, where separate lens members 17 are arrayed.

Figure 6:
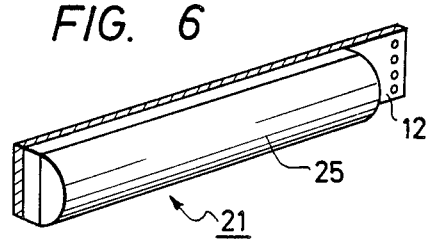
FIG. 6 is a perspective view of a lens member and a light-blocking member which are separately mounted.
Figure 7:
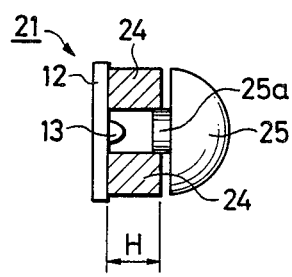
FIG. 7 is a cross-sectional view of the lens member and the light-blocking member shown in FIG. 6.
Figure 8:
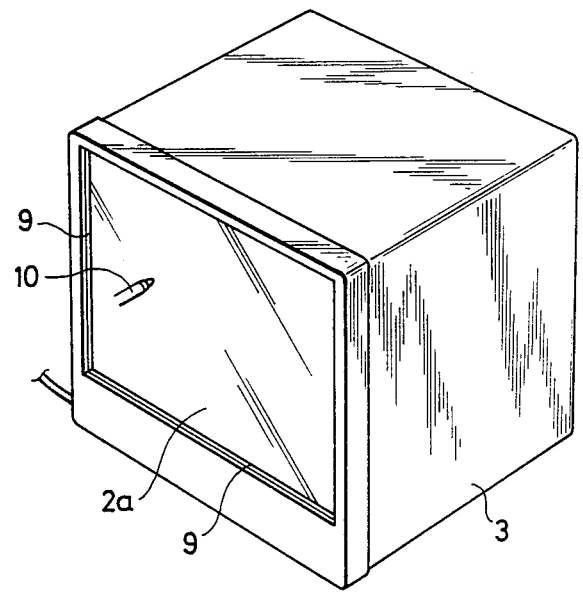
FIG. 8 is a perspective view of a display device on which a conventional coordinate data entry device is installed.
Figure 9:
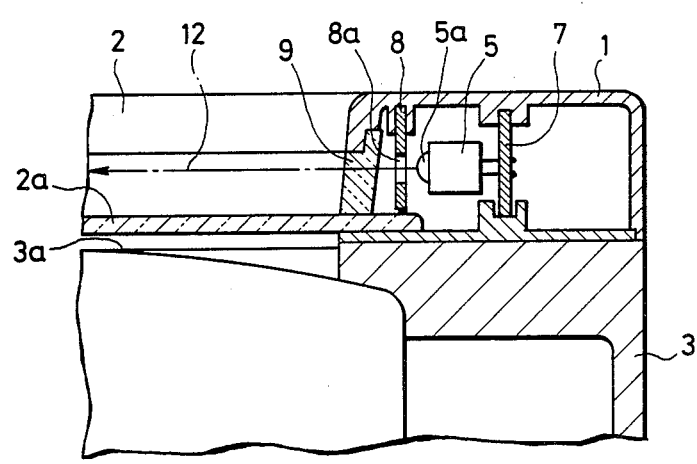
FIG. 9 is a fragmentary cross-sectional view of the devices shown in FIG. 8, for particularly showing one light-receiving device of the coordinate data entry device.
Figure 10:
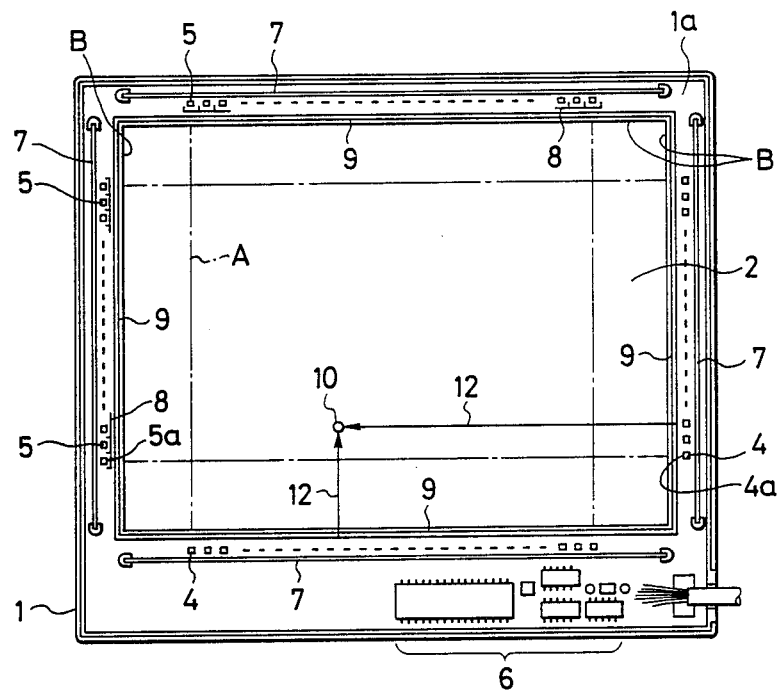
FIG. 10 is a front elevation of the devices shown in FIG. 8.
Figure 11:
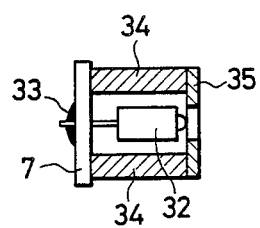
FIG. 11 is a rear elevation of another conventional coordinate data entry device, and in which the rear plate is omitted for showing the internal structure of the entry device.

Referring next to FIGS. 6 and 7, there is shown a further array according to the invention. The array, generally indicated by numeral 21, has a base formed by a printed-wiring board 12. Chips 13 of a light-emitting or -receiving material are bonded to the board 12 such that they are aligned longitudinally. The chips 13 are regularly spaced from one another. Light-blocking members 24 having a certain height H are formed integrally with the board 12 and close to the chips 13. A long lens member 25 is made from acrylic resin or similar material and semicircular in cross section. The lens member 25 is provided with a protrusion 25a on its bottom surface so that it is held between the light-blocking members 24. The lens member 25 is spaced a distance equal to the height H of the light-blocking members 24 from the chips 13. That is, the light-blocking members 24 also act as spacers between each chip 13 and the lens member 25.

Since the array according to the invention is constructed as described above, the steps for manufacturing optical elements such as light-emitting diodes are made unnecessary when the array is fabricated. This dispenses with mounting operation. Further, the array is made up of a less number of components, because a stop member or coating material making use of a resin or taping is rendered unnecessary. Of course, various changes and modifications may be made to the shape of the lens member 25, as long as it extends continuously and can be quickly mounted to the light-blocking members 24.

As described above, the novel array requires less steps to manufacture and is made up of a less number of components. The array can be quickly fabricated while imparting the same function as the prior art optical element to it. Unlike the case where each element is fabricated separately, the novel array does not differ in accuracy from product to product. Since it is made up of less components and manufactured with less steps, it can be more economical to manufacture than conventional.

What is claimed is:

1. In an optical coordinate data entry device having arrays of light emitting elements and light receiving elements disposed around the sides of a display screen for forming a matrix of light beams in front of the display screen for detecting the presence of a pointing object interposed in the matrix, and a filter disposed in front of the light receiving and emitting elements around the sides of the display screen for preventing light external to the device from affecting the light receiving elements and light from the light emitting elements from being projected outside the device, the improvement comprising each array of light elements being mounted in a row on a longitudinally extending baseplate, and a filter associated with said array being formed as a longitudinally extending member having a longitudinal concavity formed in one side facing the baseplate, said concavity being defined by longitudinally extending side walls spaced apart from each other and a longitudinally extending front wall provided on the side walls so as to form a U-shaped cross-section, wherein said side walls are mounted on the baseplate such that said concavity encloses the row of light elements, said filter further having a lens member formed on said front wall, on an opposite side from the concavity facing toward the matrix, for focusing light beams passing to or from the light elements, said lens member being accurately spaced from and mounted in registration with the light elements by a selected width and shape of the side walls mounted on the baseplate, whereby the filter and lens member for the light elements are both formed by one integrated structure for convenience of assembly.

2. An optical coordinate data entry device according to claim 1, wherein said side walls, front wall, and lens member are integrally molded in one piece made of plastic material.

3. An optical coordinate data entry device according to claim 1, wherein said lens member is a single longitudinally extending member having a semicircular cross-section integrally molded on the front wall.

4. An optical coordinate data entry device according to claim 1, wherein said lens member is a single longitudinally extending member having a semicircular cross-section, and has a protrusion on a rear side thereof dimensioned to be insertably fitted in the spacing between the side walls for mounting the lens member thereon, said lens member thereby also constituting the front wall of the filter.

5. An optical coordinate data entry device according to claim 1, wherein said lens member comprises a plurality of spherical protrusions integrally molded on the front wall and positioned in a row corresponding to the light elements.

* * * * *